(12) United States Patent
Warren et al.

(10) Patent No.: US 7,788,275 B2
(45) Date of Patent: Aug. 31, 2010

(54) CUSTOMIZATION OF RELATIONSHIP TRAVERSAL

(75) Inventors: Matthew J. Warren, Redmond, WA (US); Dinesh C. Kulkarni, Sammamish, WA (US); Anders Hejlsberg, Seattle, WA (US); Henricus Johannes Maria Meijer, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 345 days.

(21) Appl. No.: 11/857,366

(22) Filed: Sep. 18, 2007

(65) Prior Publication Data

US 2009/0077120 A1    Mar. 19, 2009

(51) Int. Cl.
G06F 7/00    (2006.01)
(52) U.S. Cl. .................... 707/763; 707/716; 707/755; 707/756; 707/809
(58) Field of Classification Search ................ None
See application file for complete search history.

(56) References Cited

U.S. PATENT DOCUMENTS

| | | | |
|---|---|---|---|
| 6,163,776 | A | 12/2000 | Periwal |
| 6,243,709 | B1 | 6/2001 | Tung |
| 6,591,275 | B1 | 7/2003 | Russell et al. |
| 6,931,630 | B1 | 8/2005 | Cotner et al. |
| 6,978,261 | B2 | 12/2005 | Cotner et al. |
| 2004/0015506 | A1 * | 1/2004 | Anonsen et al. ............. 707/100 |
| 2004/0015516 | A1 * | 1/2004 | Harter et al. ............. 707/104.1 |
| 2004/0177093 | A1 * | 9/2004 | Mullins .................... 707/104.1 |
| 2005/0050068 | A1 * | 3/2005 | Vaschillo et al. ............ 707/100 |
| 2005/0138064 | A1 * | 6/2005 | Trappen et al. ......... 707/103 R |
| 2005/0154722 | A1 | 7/2005 | Seitz et al. |
| 2007/0027906 | A1 | 2/2007 | Meijer et al. |
| 2007/0027907 | A1 | 2/2007 | Kulkarni et al. |
| 2007/0055647 | A1 | 3/2007 | Mullins et al. |
| 2007/0055692 | A1 * | 3/2007 | Pizzo et al. ............. 707/103 R |

OTHER PUBLICATIONS

Won Kim. Object Oriented Data base Systems: Promises, Reality, and Future. 19th VLDB Conference, Dublin Ireland, 1993. UniSQL Inc. http://www.sigmod.org/vldb/conf/1993/P676.PDF. Last accessed Jun. 1, 2007.

Gerhard Wanner, et al. Design Patterns to Increase Performance When Using an Object-Relational Mapping and Their Categorization http://www.old.netobjectdays.org/pdf/03/papers/industry/570.pdf. Last accessed Jun. 1, 2007.

Jack Orenstein, et al. Supporting Retrievals and Updates in an Object/Relational Mapping System. Bulletin of the IEEE Computer Society Technical Committee on Data Engineering, 1999. http://sites.computer.org/debull/99mar/orens.ps. Last accessed Jun. 1, 2007.

* cited by examiner

*Primary Examiner*—Pierre M Vital
*Assistant Examiner*—Mohammad S Rostami
(74) *Attorney, Agent, or Firm*—Workman Nydegger

(57) ABSTRACT

An object-relational mapping mechanism facilitates customized relationship traversal. The mechanism can override default loading behavior with custom functionality (e.g., eager loading, lazy loading . . . ) specified by a programmer, for example. In other words, the object-relational mapping mechanism includes an extensibility point or hook for customization.

11 Claims, 12 Drawing Sheets

CUSTOMIZATION OF RELATIONSHIP TRAVERSAL

BACKGROUND

Object-relational (O-R) technologies enable the relational database world to interact with the object-oriented programming world. Relational database management systems (RDBMS) supporting a relational database pre-dated the popularization of object-oriented programming. Utilizing relational databases to store object-oriented data leads to a semantic gap where programmers are required to design their software to function in two different worlds—processing data in object-oriented form, yet storing the same data in relational form.

Requiring constant conversion between two different forms of the same data not only had the effect of stifling performance but also imposed difficulties for programmers as relational or object-oriented forms would impose limitations on each other. For example, relational databases make complicated associations difficult, and they tend to map poorly into the object-oriented world. This problem is sometimes referred to as the object-relational impedance mismatch.

Generally, relational databases use a series of tables representing simple data, where optional or related information is stored in other tables. A single object record in the database often spans several of these tables, and requires a join to collect all of the related information back into a single piece of data for processing. This would be the case for a sales database, for instance, which would likely include at least a customer and order table and perhaps a sales representative table.

In the object world, there is a clear sense of ownership, where a particular customer object owns a particular order in terms of the aforementioned example. This is not the case in relational databases. The tables have no understanding how they relate to other tables at a fundamental level. Instead, a user needs to construct a query to gather information. Queries not only identify what information to return, but they also have to specify how involved tables are related to each other. Thus, relationships in a relational system are typically known only when a query is run that specifies such relationships.

O-R mappers (ORMs) are often employed to facilitate bridging the gap between the relational and object-oriented worlds. O-R mappers enable queries to be written against a mapped object model instead of an underlying relational model. Classes are mapped to tables and relationships between classes are mapped to foreign keys or similar relationships in a database. For example, customer and order classes are mapped to customer and order tables (e.g., "CustomerTable," "OrderTable") while navigational relationships "Customer.Orders" and "Order.Customer" are mapped to the foreign key relationship between corresponding tables.

SUMMARY

The following presents a simplified summary in order to provide a basic understanding of some aspects of the disclosed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Briefly described, the subject disclosure pertains to customized relationship traversal. More particularly, rather than being bound to functionality afforded by O-R mapping vendors, the implementation can be opened up to allow the loading of objects and/or object relationships to be customized. Furthermore, additional action can be specified before, after or surrounding a load operation.

In accordance with one aspect of the disclosed subject matter, an object-relational mapper or mapping system is provided that facilitates customization. Default object relationship loading provided by the mapper can be overridden or otherwise altered by custom specified functionality if provided. Alternatively, the mapper can fall back on the default behavior. Moreover, customization can be designated at various levels of granularity, where desired, such as per relationship. Accordingly, there can be a mixture of default and customized behavior.

According to another aspect of the disclosed subject matter, customization can be transparent. In other words, application developers need not alter their programs to take advantage of customized loading. Rather, default functionality can be replaced by custom action behind the scenes and without application knowledge.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

DETAILED DESCRIPTION

Systems and methods facilitate custom navigation of object relationships. An object-relational mapping mechanism is extended to allow external control and customization of relationship loading performed thereby. Default relationship loading behavior can be overridden by specialized functionality specified by program developers, for example. In one implementation, customization can be accomplished transparently to aid use and adoption of such technology. Furthermore, customization can be performed automatically via static and/or dynamic analysis and functionality generation, among other things.

Various aspects of the subject disclosure are now described with reference to the annexed drawings, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents and alternatives falling within the spirit and scope of the claimed subject matter.

Figure 1:
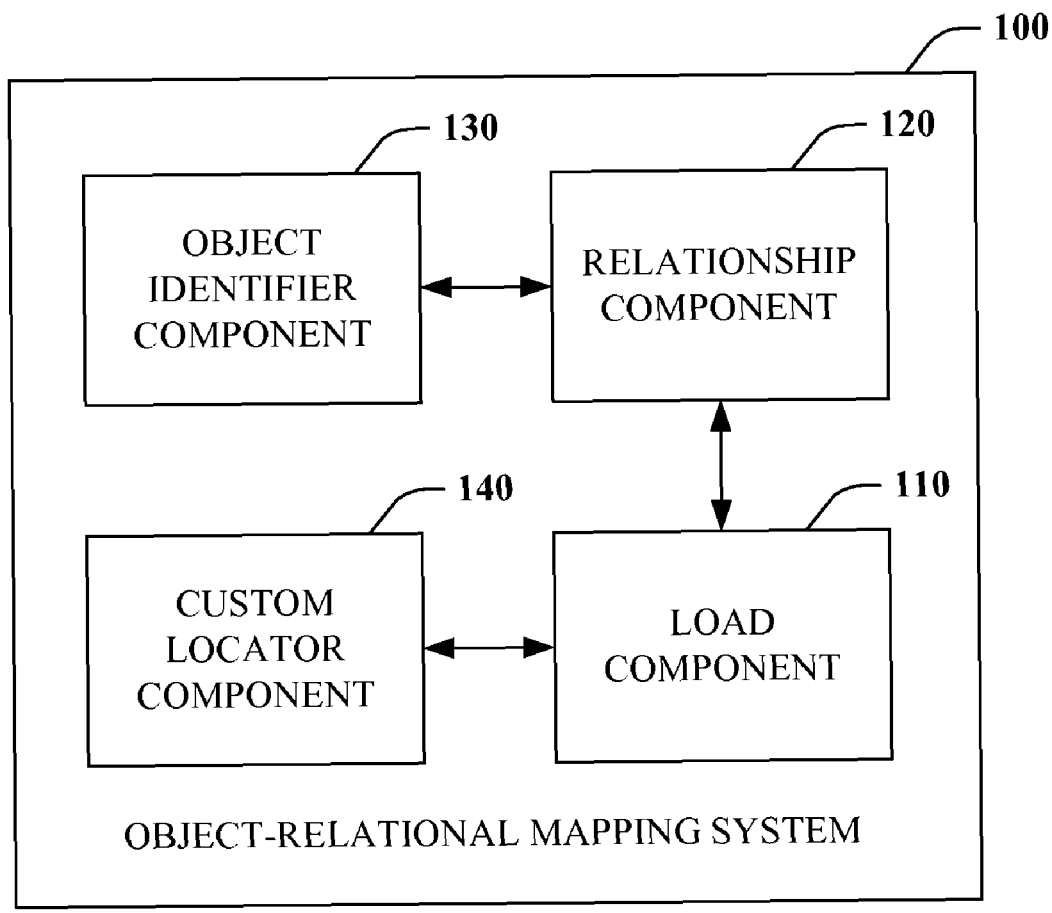
FIG. 1 is a block diagram of an object-relational mapping system in accordance with an aspect of the subject disclosure.

Referring initially to FIG. 1, an object-relational mapping system 100 (also referred to as O-R or object-relational mapper) is illustrated in accordance with an aspect of the claimed subject matter. The O-R mapper 100 maps object-oriented constructs to relational database constructs. It allows object-oriented program queries to be written against a mapped object model instead of an underlying relational model. In use, objects are loaded from relational tables for program analysis and/or modification, among other things. For example, a customer object might be loaded to view or alter a customer's address or other information. Further, object relationships such as "Customer.Orders" can be loaded.

Moreover, the O-R mapper 100 enables its default relationship loading functionality to be overridden or otherwise customized. Among other things, this opens up the O-R mapper implementation and gives more control to developers, for instance. O-R mappers need to be able to handle numerous and diverse situations requiring special processing. As a result, object-relational tool or framework developers are faced with a dilemma of how to cater to the widest possible range without overloading the framework with special features. The O-R mapper 100 addresses this dilemma by enabling customization of relationship loading at various levels of granularity including on a per-relationship level.

More particularly, the O-R mapper 100 includes a load component 110 for loading object relationships or object related data. The load component 110 can retrieve relational data and load it in an accessible object-oriented form for application processing. Relationship component 120 identifies relationships for loading to the load component 110. Relationships can be loaded lazily or eagerly. Accordingly, the relationship component 120 can simply identify a relationship to load as specified or as needed. Alternatively, the relationships can be identified more proactively and pre-fetched. Object identifier component 130 is operable to identify loaded objects to the relationship component 120 to facilitate pre-fetching of object relationships that are likely to be called in the future, for instance.

Once one or more relationships are designate for loading, the load component 110 can employ custom locator component 140 to identify any custom functionality associated with loading a particular relationship or set of relationships. The custom locator component 140 can search one or more local or remote sources to identify custom functionality associated with relationship loading. In one instance, a naming convention can be required to specify such functionality and pattern or signature matching techniques utilized to identify the functionality. Additionally or alternatively, particular attributes or other conventions can be utilized to designate custom load functionality, inter alia. The load component 110 can subsequently ensure that the custom load functionality is executed as specified for relationship loading.

In accordance with one particular implementation, the default behavior override can be accomplished behind the scenes in a transparent manner. The code that a developer writes can be exactly the same as if overrides did not exist. The implementation need not require a programmer to perform special actions to invoke load override. Once the override functionality is specified and made available, the mapping implementation takes care of the rest. The code written with overrides is exactly the same as code written without overrides. This can be implemented as a function of naming convention and signature matching, among other things.

Figure 2:
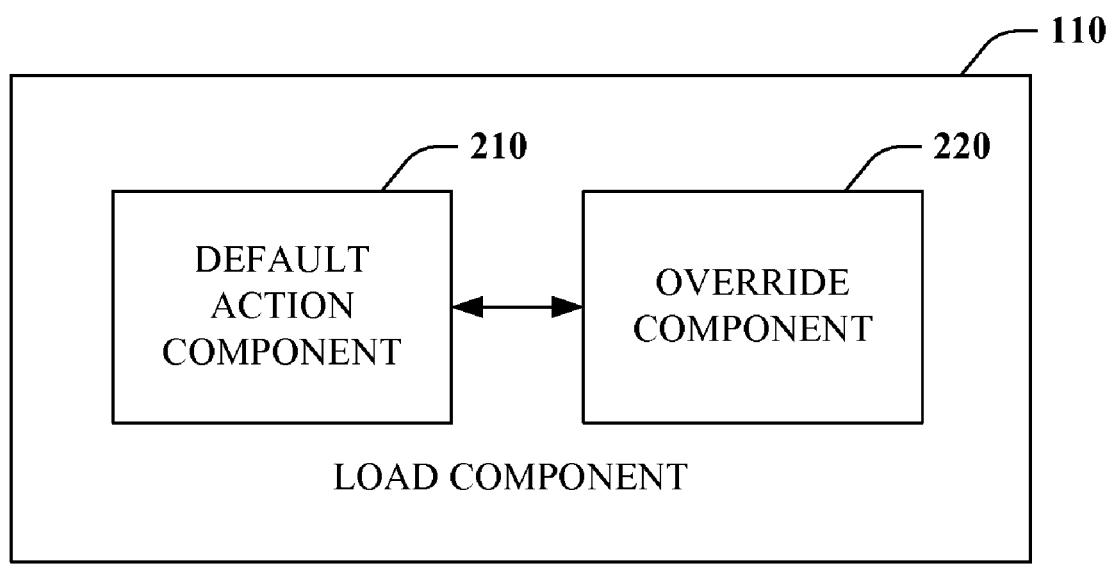
FIG. 2 is a block diagram of a representative load component.

Turning attention to FIG. 2, a representative load component 110 is depicted in accordance with an aspect of the claimed subject matter. The load component 100 includes default action component(s) 210 that specifies standard relationship loading functionality. For example, a default action component 210 can provided for deferred loading of a particular relationship utilizing a dynamically generated query. Override component 220 overrides default action or behavior with custom behavior, if available. Accordingly, either the default or custom behavior can be employed to load a relationship. However, the custom behavior can specify the default behavior alone or in conjunction with additional functionality. For example, logging or security functionality can be specified surrounding a default loading behavior.

In accordance with one aspect, custom behavior can specify the use of stored procedures (sprocs) for relationship loading. Stored procedures are often important for accessing relational data. For security, performance, and control reasons, database administrators (DBAs) often permit only sproc-based access and do not allow dynamic SQL, for instance. Hence, some object-relational mapping implementations can call stored procedures for retrieving objects directly. For example, a stored procedure "sp_CustomersByRegion" can be called to retrieve all customers from a given region.

Conventionally, relationship loading requires dynamic query generation. Hence, stored procedures and relationship loading are traditionally disjoint since stored procedures have to be called explicitly while relationship loading is performed behind the scenes or under the covers by an object-relational mapping implementation. In an organization where only sproc-based database access is allowed, the object-relational mapping implementation is effectively crippled, because a critical aspect, relationship loading, is unavailable. Consequently, a user has to load all required objects explicitly by calling sprocs or methods wrapping sprocs and connect them together.

The object-relational mapper 100 of FIG. 1 and associated load component 110 provide a mechanism to a user (e.g., a programmer using an O-R mapper to write an application) to specify action to be taken when loading a relationship. The action may include a call to a stored procedure, a method wrapping a stored procedures or something more general and customized. This action can be referred to as a load override, which is effective for both deferred (a.k.a. lazy or demand) and immediate (a.k.a. eager) loading of relationships.

Figure 3:
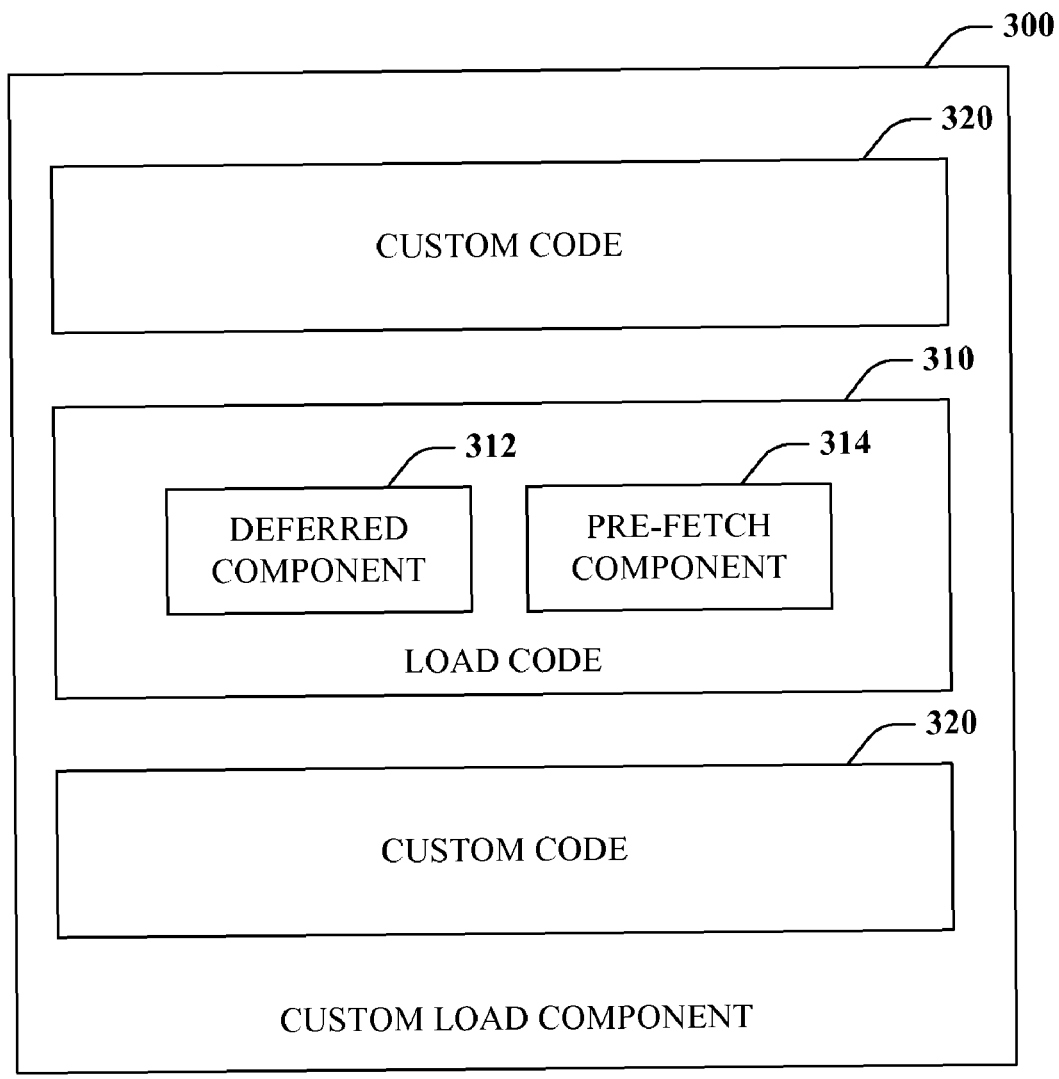
FIG. 3 is a block diagram of a representative custom load component.

Referring to FIG. 3, a representative custom load component 300 is illustrated in accordance with an aspect of the claimed subject matter. The custom load component 300 can be specified by a program developer, automatically generated, or some hybrid in between. Furthermore, portions of the custom load component 300 can reside proximate or remote from each other. As shown, the custom load component 300 can include load code or other mechanism 310. The load code 310 specifies how one or more relationships are to be loaded. The load code 310 can include one or more of deferred component 312 and pre-fetch component 314. Accordingly, the load code 310 can specify deferred loading perhaps based on an explicit call and/or pre-fetch loading in which relationships are loaded in advance in anticipation of use. The load code 310 can also be conditional or context sensitive. Whether eager loading or deferred loading is employed can depend on context. For example, if a particular customer does not have a large number of orders, order details could be pre-fetched, whereas if there are a large number of orders navigation of that relationship could be deferred. It is also to be appreciated that the load code 310 can generate dynamic queries or utilize stored procedures, among other mechanisms.

In addition to load code, the custom load component 300 can also include additional custom code 320 before, after and/or surrounding the load code. This additional code can specify any desirable action in addition, yet related, to loading of relationships. By way of example and not limitation, mechanisms can be provided for logging data access for legal or other reasons. Validation logic can also be inserted such that retrieved information is subject to various checks and verifications. Further yet, security mechanisms can be included to control access to data based on associated individual or group privileges, policies or the like.

It is also to be noted that functionality provided by custom load components 300, for instance, can be specified at various levels of granularity including on a per relationship basis. Stated differently, default-loading behavior can be overridden with custom functionality based on need or desire without having to take over or customize loading of all relationships. For example, a relationship between "Customer" and "ConfidentialCustomerInformation" objects can be overridden to provide additional security checks while leaving the relationship between "Customer" and "SalesRepresentative" objects for default loading.

Figure 4:
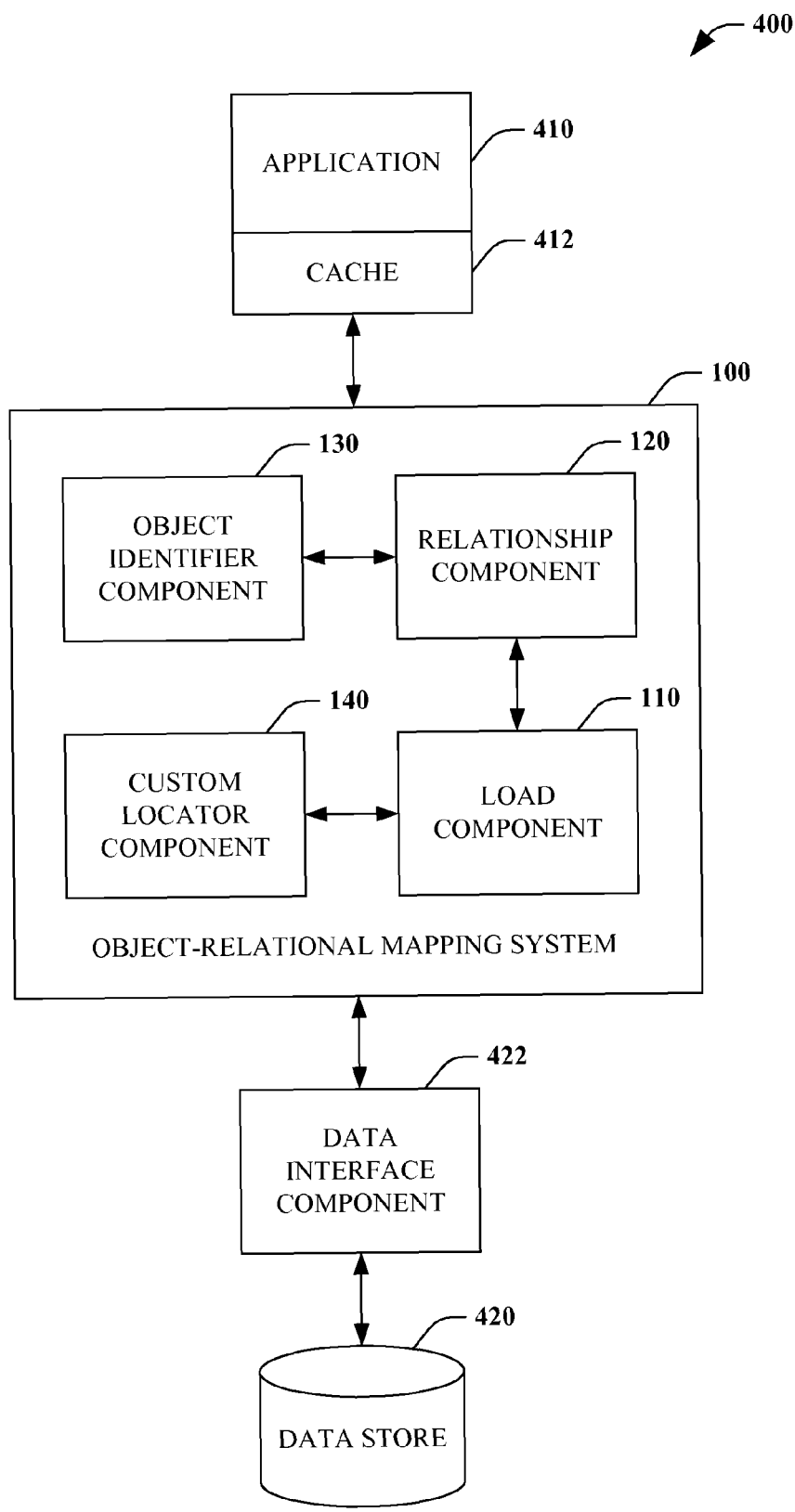
FIG. 4 is a block diagram of an exemplary computer system in accordance with an aspect of the disclosed subject matter.

Referring to FIG. 4, an exemplary computer system 400 is illustrated in accordance with an aspect of the claimed subject matter. The system includes an object-relational mapping system or O-R mapper 100, as previously described. The O-R mapper 100 facilitates interaction between application component 410 and relational data housed in data store 420 by mapping objects to tables or vice versa. Moreover, the O-R mapper 100 supports customized relationship traversal or loading. The application 410 can load an object in application cache 412 or the like utilizing any conventional mechanism. Subsequently, object relationships can be loaded in application cache 410 in accordance with designated custom functionality for example in a deferred or eager manner. More particularly, the O-R mapper 100 can generate and transmit a request to data interface component 422 for particular relationship data. In one embodiment the data interface component 422 can correspond to a database management system (DBMS). However, the claims are not limited thereto. For example, the data interface component 422 can correspond to a web service, among other things. The data interface component 422 can retrieve relational data from the data store 420 (e.g., local or remote) and return it to the O-R mapper 100 that translates it from relational data to object data and loads it to application cache 412.

Figure 5:
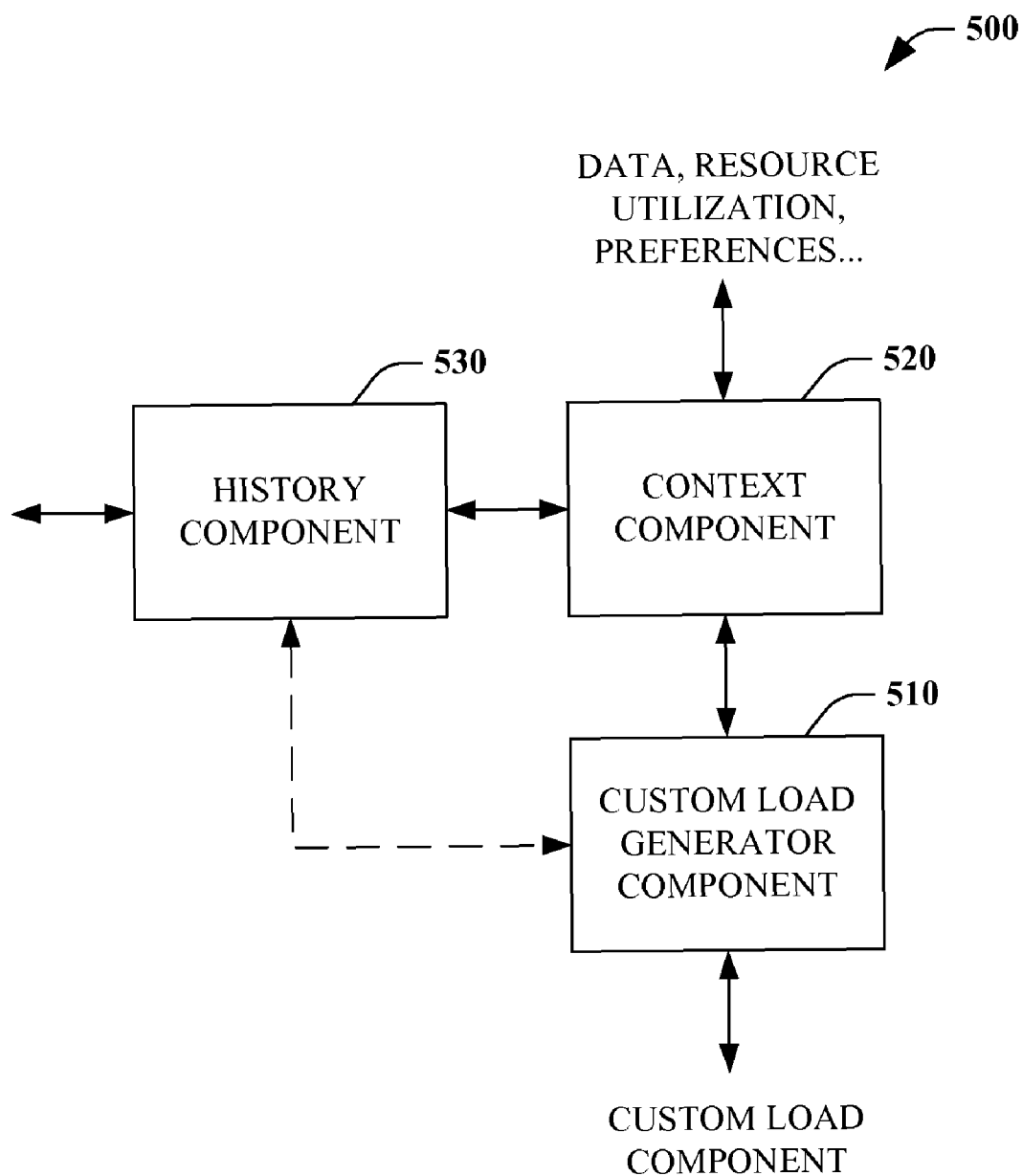
FIG. 5 is a block diagram of a custom load component generation system in accordance with an aspect of the disclosed subject matter.

Turning attention to FIG. 5, a custom load component generation system 500 is depicted in accordance with an aspect of the claimed subject matter. In accordance with one aspect, custom load components and/or associated functionality can be programmer specified. Additionally or alternatively, such components can be generated automatically. The system 500 includes a custom load generator component 510 that generates a custom load component such as that described with respect to FIG. 3. Generated functionality can alter a loading procedure and/or add functionality to a default loading function, among other things. Generation can occur at compile time or run time. Where needed, hot spot or dynamic compilation can be employed by the generation component 510 or a separate compiler component (not shown). The custom load generation component 510 requests and/or retrieves information from context component 510 to aid generation of appropriate functionality.

The context component 510 receives, retrieves, or otherwise obtains, acquires, or determines contextual information such as object or relationship data, resource utilization, preferences and/or policies. For instance, values of fields in a record can be consulted and utilized to make a decision as to whether something special or intelligent should be done. By way of example, if a customer service representative retrieves a customer record while conversing with a customer over the phone and it is determined from the value of fields in a record that the customer has been late in paying, custom load functionality can be added can automatically be inserted that automatically executes a credit check.

The system 500 can also include a history component 530 that monitors relationship traversal globally, by group, or individually. This information can be provided directly to the custom load generation component 510 or indirectly via the context component 52 and utilized in potentially altering or customizing relationship loading. For instance, if it can be determined that given a particular object certain relationships are loaded with a higher probability than others, these relationships can be pre-fetched or cached to facilitate expeditious navigation.

What follows is a more concrete example of one manner in which various aspects of the claimed subject matter can be employed. It should be noted that the example is not meant to limit the scope of the claims or innovation in any manner. Rather, the sole purpose of this example is to provide clarity and aid understanding of a few claimed aspects.

Figure 6:
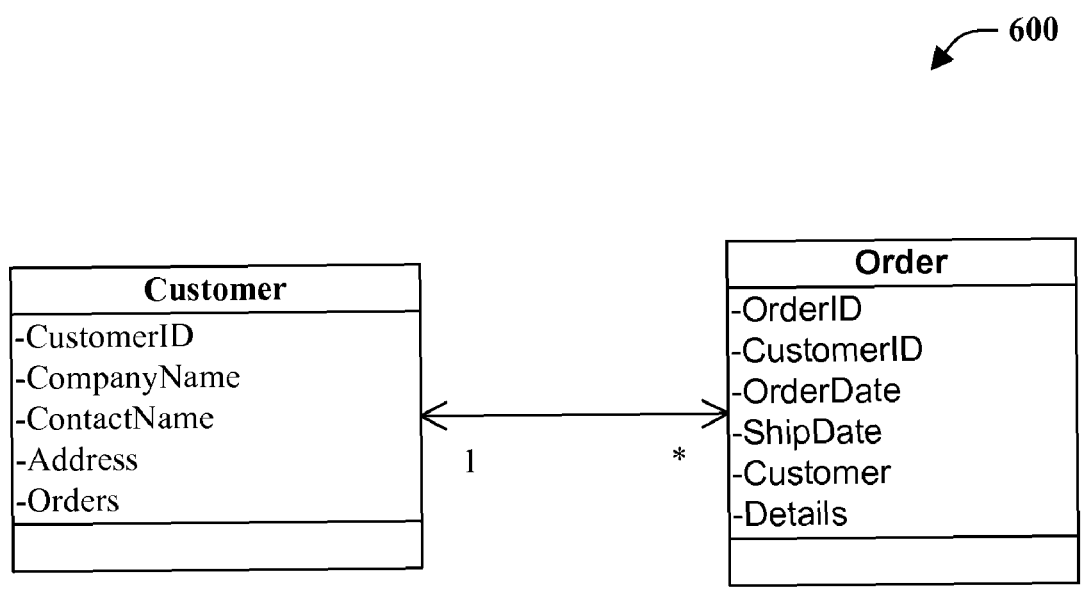
FIG. 6 is a unified modeling language (UML) class diagram in accordance with a disclosed exemplary scenario.

Object-relational mapping (ORM) allows a class to be mapped to a table or a view composed of one or more tables. There may be relationships between classes modeled as object references or collections of references. For example, consider the following model with two classes "Customer" and "Order" related to each other as shown in the Unified Modeling Language (UML) class diagram 600 of FIG. 6. Here, there can zero-to-many "Orders" for a "Customer" (1:n relationship)

Consider the following database tables "CustomerTable" and "OrderTable" to which the classes are mapped.

```
create table CustomerTable (
    CustomerID      integer identity,
    CompanyName     varchar(100),
    CompanyName     varchar(100),
    Address         varchar(100),
    CONSTRAINT PK_CustomerTable PRIMARY KEY (CustomerId)
)
create table OrderTable (
    OrderID         integer identity,
    CustomerID      integer not null,
    OrderDate       DateTime not null,
    ShipDate        DateTime not null,
    CONSTRAINT PK_OrderTable PRIMARY KEY (OrderID),
    CONSTRAINT FK_OrderCustomer FOREIGN KEY (CustomerID)
references DivisionTable(CustomerID)
)
```

An outline of the corresponding classes is shown below. For brevity, some of the details are elided and for simplicity, all members are shown public. External mapping in this example is 1:1 between class:table and class member: table column and is not shown here.

```
class Customer
{
    public int CustomerID;
    public string CompanyName;
    public string ContactName;
    public EntitySet<Order> Orders;
}
class Order
{
    public int OrderID;
    public int CustomerID;
    public DateTime OrderDate;
    public DateTime ShipDate;
    public EntityRef<Customer> Customer;
}
```

In addition to the above classes, the following convenience class can be generated for simplifying language-integrated queries (LINQ).

```
public partial class Northwind  :  DataContext {
    public System.Data.Linq.Table<Customer> Customers;
    public System.Data.Linq.Table<Order> Orders;
}
```

This example will now be used to illustrate relationship loading with sprocs or custom actions. Relationships between classes can be used for eager or deferred loading and are represented using EntitySet< > and EntityRef< > for collection and singleton targets respectively.

The following code snippet shows how a user or system can add methods to override the default loading behavior and perform custom action for loading. The mechanism works as follows:

1. User or system adds a method for each relationship that they want to have custom loading action.
2. The method follows a specific signature (e.g., type and number of arguments) and has a name specific to the relationship being loaded.
3. The object-relation mapping implementation, checks for the existence of such a method in the class derived from "DataContext" for loading related object(s). If a matching user-specified method is called, it is automatically invoked without any additional work on part of the user. The method is treated as an override of the usual loading action. If such a method is not found, the implementation can perform the usual loading with dynamically generated SQL, for instance.

```
Public partial class Northwind: DataContext {
    ...
    private IEnumerable<Order> LoadOrders(Customer customer) {
        // User's custom code for calling a sproc
        // or performing any other custom action goes here
        // The method must return a collection of Orders
    }
    private Customer LoadCustomer(Order order) {
        // User's custom code for calling a sproc
        // or performing any other custom action goes here
        // The method must return a Customer object
    }
}
```

The check for an override method can be based on the following naming and signature convention.

1. The return type matches the singleton or collection being loaded. Hence, "Customer.Orders" collection is loaded with the first method above that returns a collection of "Orders." On the other hand, "Order.Customer" singleton object is loaded with the second method that returns a "Customer."
2. The input parameter should be the starting point of the navigation. Hence, "Customer.Orders" load override takes in a "Customer" as the input while "Order.Customer" takes in an "Order" as the input.
3. The name of the method is "Load" followed by the property being loaded. Ergo, "Customer.Orders" load override has the name "LoadCustomer" while "Order.Customer" override has the name LoadCustomer.

It is to be noted that the naming convention itself is separate from the override mechanism, but it makes the override easier to write and understand.

Now consider a load override method in action. The following code snippet sets up an instance of "DataContext"—a class used for queries and updates against the database. The "DataContext" instance is then used to load a collection of customers. Once the customer objects are created, related "Orders" for each "Customer" can be navigated to simply. Under the covers or behind the scenes, they are retrieved from the database through deferred loading.

```
static void Main(string[ ] args)
{
    string connectionString = ...;
    // The following line creates an instance of a class derived from
    // the DataContext class
    Northwind db = new Northwind(connectionString);
    var custQuery = from c in db.Customers
            where c.City == "London"
            select c;
    foreach (Customer cust in custQuery) {
        foreach (Order ord in cust.Orders) {
            // Orders are defer loaded on reference using the
            override method
            // One invocation per customer
            // Each order is processed here
        }
    }
}
```

The deferred loading capability in the code above may be common to some object-relational mapping implementations. However, here the capability to seamlessly integrate custom user/system action (including a call to a sproc) into deferred loading is added.

Load override methods may also be used with immediate loading without any additional work. Here, implementation checks for load override methods for both eager and lazy loading. According, the mechanisms described here are usable regardless of the choice of deferred or immediate loading or any combination of the two approaches to loading. The power of the described approach derives from its orthogonality. A developer can mix and match it with other capabilities of an object-relational framework. It can be explicitly designed as a separate mechanism from those used for mapping, eager loading, and the like.

In one implementation, the override mechanism does not require any changes to generated code for object model or the mapping between object model and the database. An override can be purely additive and selectively added to any or all relationship even after the object model and mapping have been created. Further, it is a common mechanism to accomplish a range of scenarios described above. This reduces the learning curve for the developer who has to write the code and makes it easier to understand for anyone using or maintaining the code.

The aforementioned systems, architectures, frameworks or the like have been described with respect to interaction between several components. It should be appreciated that such systems and components can include those components or sub-components specified therein, some of the specified components or sub-components, and/or additional components. Sub-components could also be implemented as components communicatively coupled to other components rather than included within parent components. Further yet, one or more components and/or sub-components may be combined into a single component to provide aggregate functionality. Communication between systems, components and/or sub-components can be accomplished in accordance with either a push and/or pull model. The components may also interact with one or more other components not specifically described herein for the sake of brevity, but known by those of skill in the art.

Furthermore, as will be appreciated, various portions of the disclosed systems above and methods below can include or consist of artificial intelligence, machine learning, or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, can automate certain mechanisms or processes performed thereby to make portions of the systems and methods more adaptive as well as efficient and intelligent. By way of example and not limitation, such mechanism can be employed with respect to the custom load generation component to automatically generated custom action to override default behavior.

In view of the exemplary systems described supra, methodologies that may be implemented in accordance with the disclosed subject matter will be better appreciated with reference to the flow charts of FIGS. 7-10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

Figure 7:
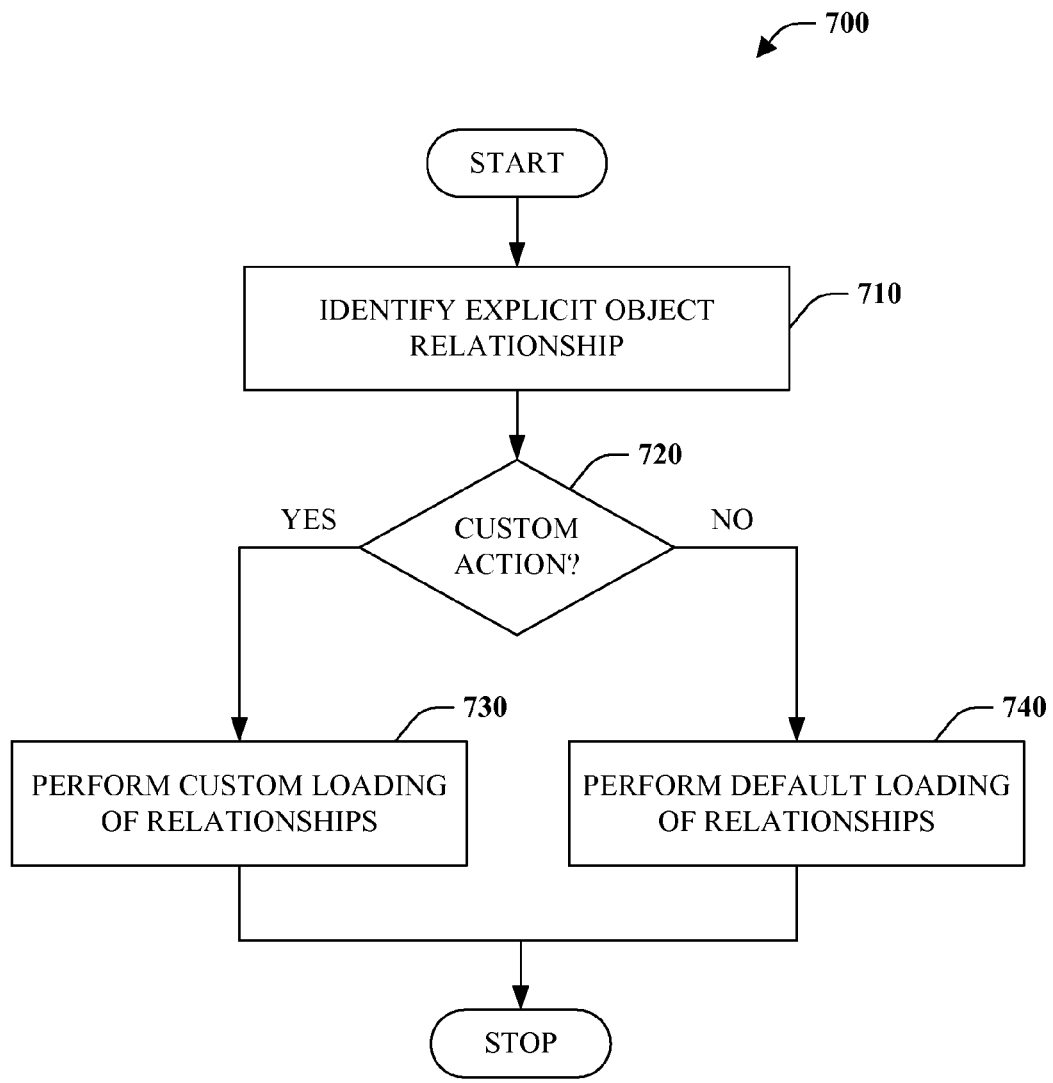
FIG. 7 is a flow chart diagram of a method of deferred object relationship loading in accordance with an aspect of the disclosed subject matter.

Referring to FIG. 7, a method of deferred relationship loading 700 is illustrated in accordance with an aspect of the claimed subject matter. At reference numeral 710, an explicit object relationship is identified or otherwise received or retrieved. This could correspond to a language-integrated query such as "Customer.Orders," for example. At numeral 720, a determination is made concerning whether any custom action has been designated for this relationship. For example, a particular location can be examined for the existence of a method matching a naming and/or signature convention. If custom action is uncovered at numeral 720 (viz., yes), custom relationship loading is performed in accordance with the designated action at reference numeral 730. By way of example, custom action can correspond to additional validation, logging, and/or security mechanism, among other things. Alternatively, if at numeral 720, custom action is located (viz., no), the method 700 continues at reference 740 where default loading of the relationship is executed.

Figure 8:
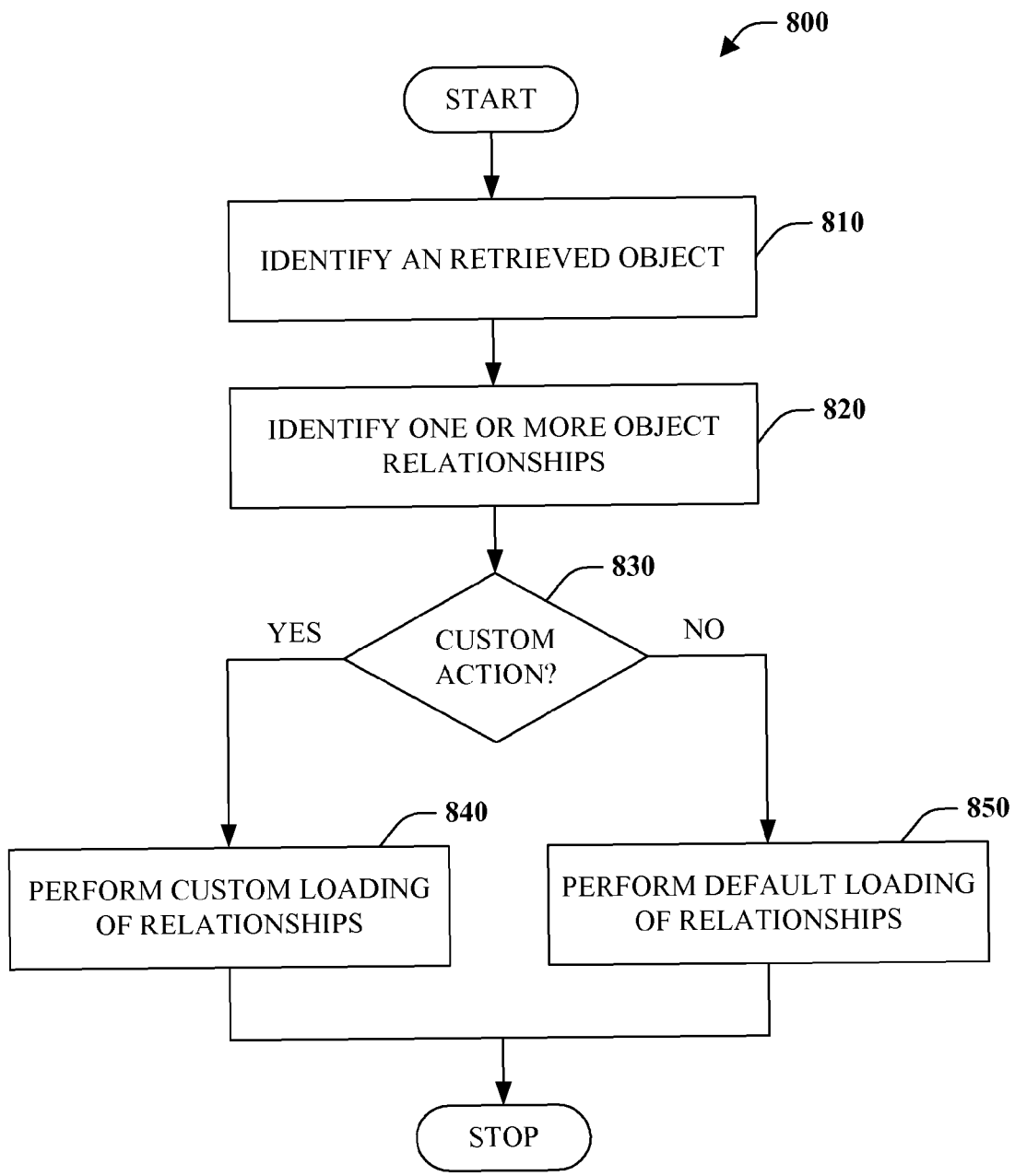
FIG. 8 is a flow chart diagram of a method of eager object relationship loading in accordance with an aspect of the disclosed subject matter.

FIG. 8 depicts a method of eager loading object relationships 800 in accordance with an aspect of the claimed subject matter. At numeral 810, a previously retrieved object can be identified. This object could have been retrieved utilizing either custom or default functionality. At reference 820, one or more relationships associated with the identified object are identified. For example, if the object is "Customer," a relationship can be "Customer.Orders." Alternatively, if the object is "Order," a relationship can be "Orders.Customer." All relationships can be identified at 820 or a subset thereof based on contextual and/or historical information. Similar to method 700 of FIG. 7, at reference numeral 830 a determination is made as to whether a custom action exists for the one or more identified relationships. Again, this can correspond to searching a local or remote space for functions, methods or the like that match a particular naming convention or signature. If a custom action exists for a relationship, that custom functionality is executed at reference numeral 840 to load the relationship or data associated therewith. Alternatively, if no custom action exists or it cannot be found, default relationship loading can be performed at numeral 850.

It is to be noted that while methods 700 and 800 of FIGS. 7 and 8 clearly delineate a difference between deferred and eager loading, the difference can be also be somewhat blurred. More specifically, the custom action itself can dictate whether relationships are deferred or eager loaded. Stated differently, the decision about the type of loading can be moved into the custom functionality. For example, even if a relationship is designated for eager loading by some other means or mechanism, custom functionality associated therewith can implement the load lazily.

Figure 9:
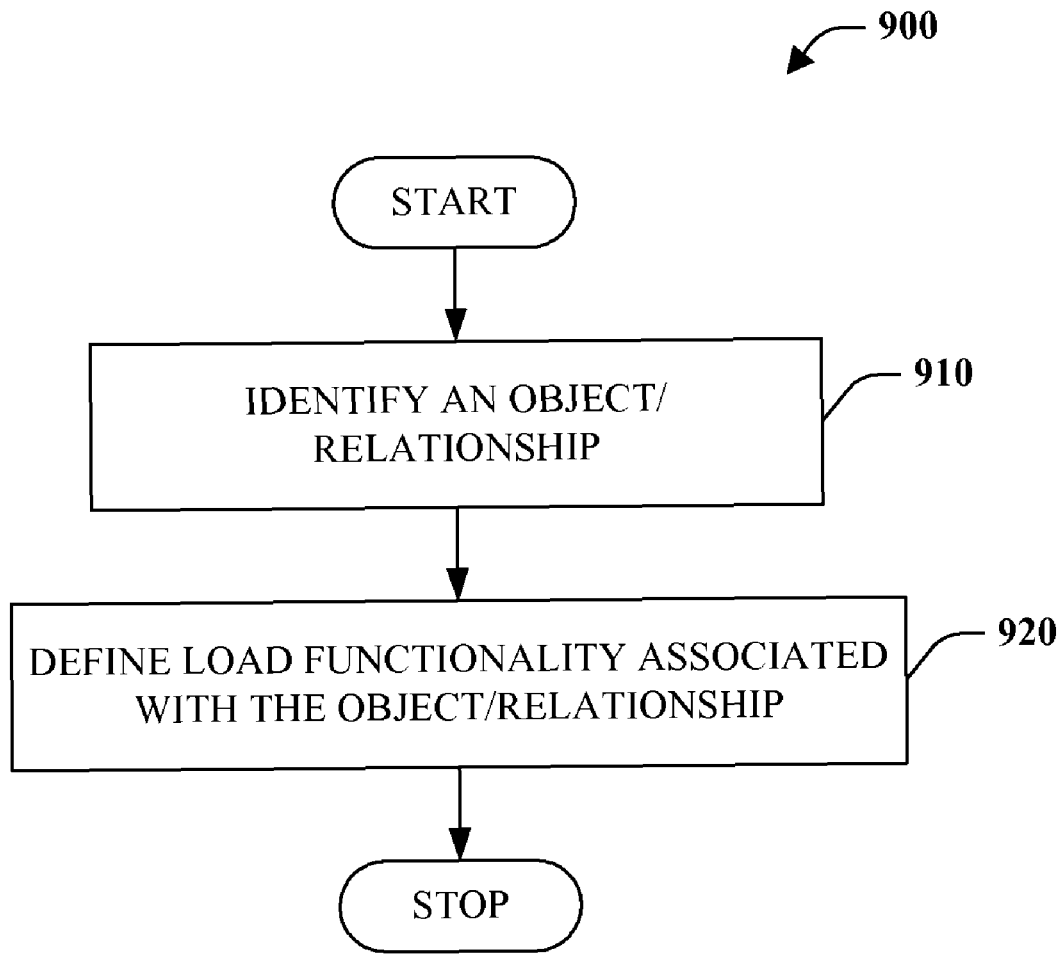
FIG. 9 is a flow chart diagram of a method of custom load action in accordance with an aspect of the disclosed subject matter.

FIG. 9 is a flow chart diagram illustrating custom load specification 900 in accordance with an aspect of the claimed subject matter. As previously, mentioned users, such as those that employ an object-relational mapper with respect to application generation, can control the manner in which a mapper loads objects and/or object relationships. No longer are they confined solely to vendor provided black box functionality. At reference numeral 910, an object or relationship is identified for which custom load functionality is desired. The functionality is subsequently defined at reference numeral 920. For example, loading can be deferred or immediate utilizing stored procedures or other mechanisms. Furthermore, additional function surrounding loading can be specified. According to one aspect, certain relationships can be selectively overridden based on business needs without having to take over all loading. For example, a relationship between "Customer" and "ConfidentialCustomerInformation" objects can be overridden to provide additional security checks while leaving the relationship between "Customer" and "SalesRepresentative" for default loading. It should also be appreciated that various code specification tools such as intelligent assistance via automatic fill and error checking can be modified to aid programmers in specifying custom load code.

Figure 10:
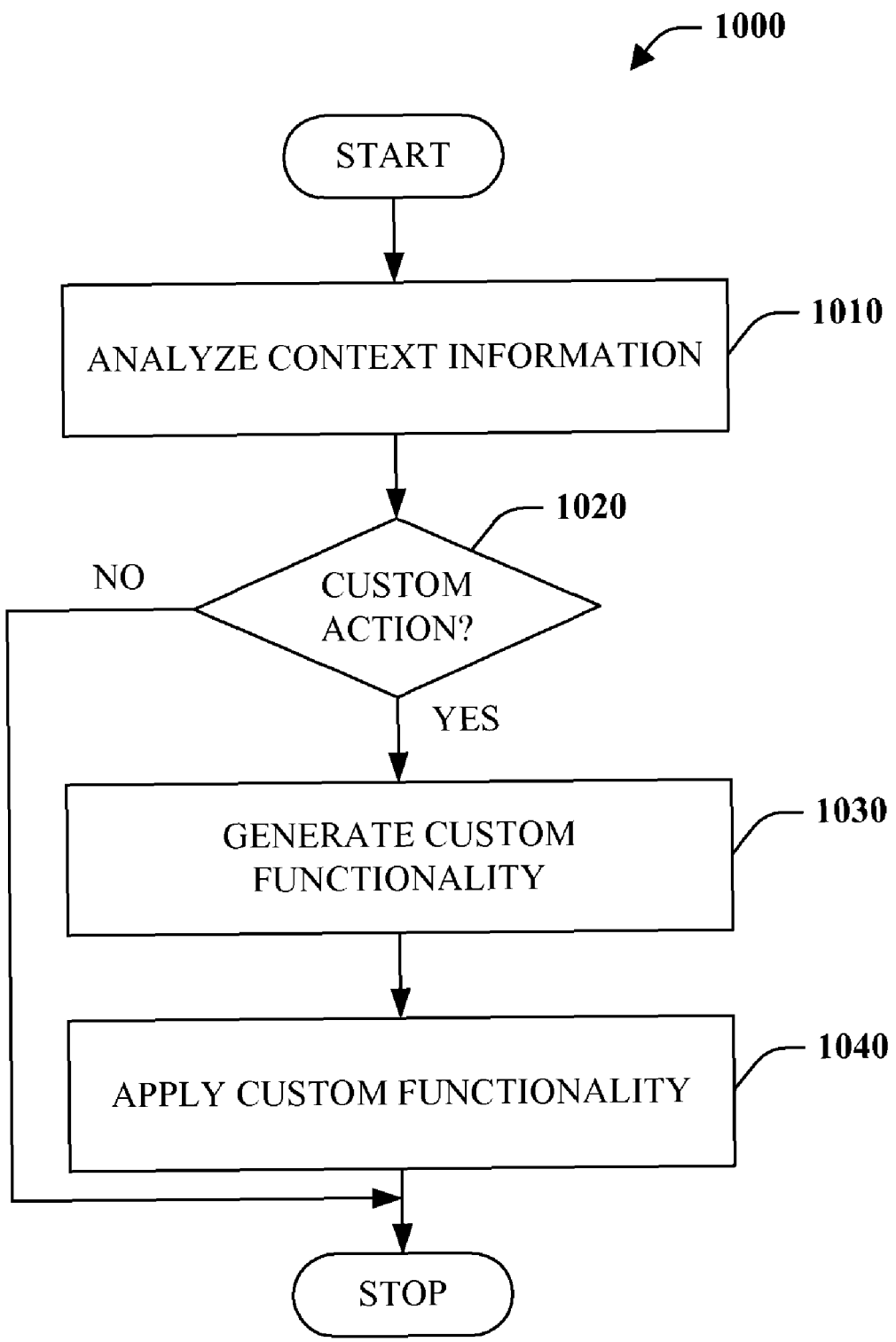
FIG. 10 is a flow chart diagram of a method of automatic custom load functionality in accordance with an aspect of the disclosed subject matter.

FIG. 10 illustrates a method 1000 of automatic customization of object and/or relationship loading according to one aspect of the claimed subject matter. At reference numeral 1010, context information is analyzed. Context information can include data and/or metadata regarding acquired information and/or information to be retrieved, historical information, preferences, and/or policies, inter alia. A reference 1020 it is determined whether custom action is desired as a function of at least the context information. If no, the method 1000 terminates. If yes, the method 1000 continues at numeral 1030 where custom functionality is generated. At reference numeral 1040, the generated functionality can be applied, injected, or otherwise made available to for use by an object-relational mapper.

It is to be noted that while this disclosure has been described and directed to object-relational mapping, the claimed subject matter is not so limited. Aspects described herein are equally applicable to any type of mapping. Accordingly, the disclosed subject matter is not limited to solely object-relational mappings and associated mechanisms but rather encompasses customizing object and/or relationship loading associated with any mapping mechanism.

As used herein, the terms "component," "system" and the like are intended to refer to a computer-related entity, either hardware, a combination of hardware and software, software, or software in execution. For example, a component can be, but is not limited to being, a process running on a processor, a processor, an object, an instance, an executable, a thread of execution, a program, and/or a computer. By way of illustration, both an application running on a computer and the computer can be a component. One or more components may reside within a process and/or thread of execution and a component may be localized on one computer and/or distributed between two or more computers.

The word "exemplary" or various forms thereof are used herein to mean serving as an example, instance or illustration. Any aspect or design described herein as "exemplary" is not necessarily to be construed as preferred or advantageous over other aspects or designs. Furthermore, examples are provided solely for purposes of clarity and understanding and are not meant to limit or restrict the claimed subject matter or relevant portions of this disclosure in any manner. It is to be appreciated that a myriad of additional or alternate examples of varying scope could have been presented, but have been omitted for purposes of brevity.

As used herein, the term "inference" or "infer" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject innovation.

Furthermore, all or portions of the subject innovation may be implemented as a method, apparatus or article of manufacture using standard programming and/or engineering techniques to produce software, firmware, hardware, or any combination thereof to control a computer to implement the disclosed innovation. The term "article of manufacture" as used herein is intended to encompass a computer program accessible from any computer-readable device or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Figure 11:
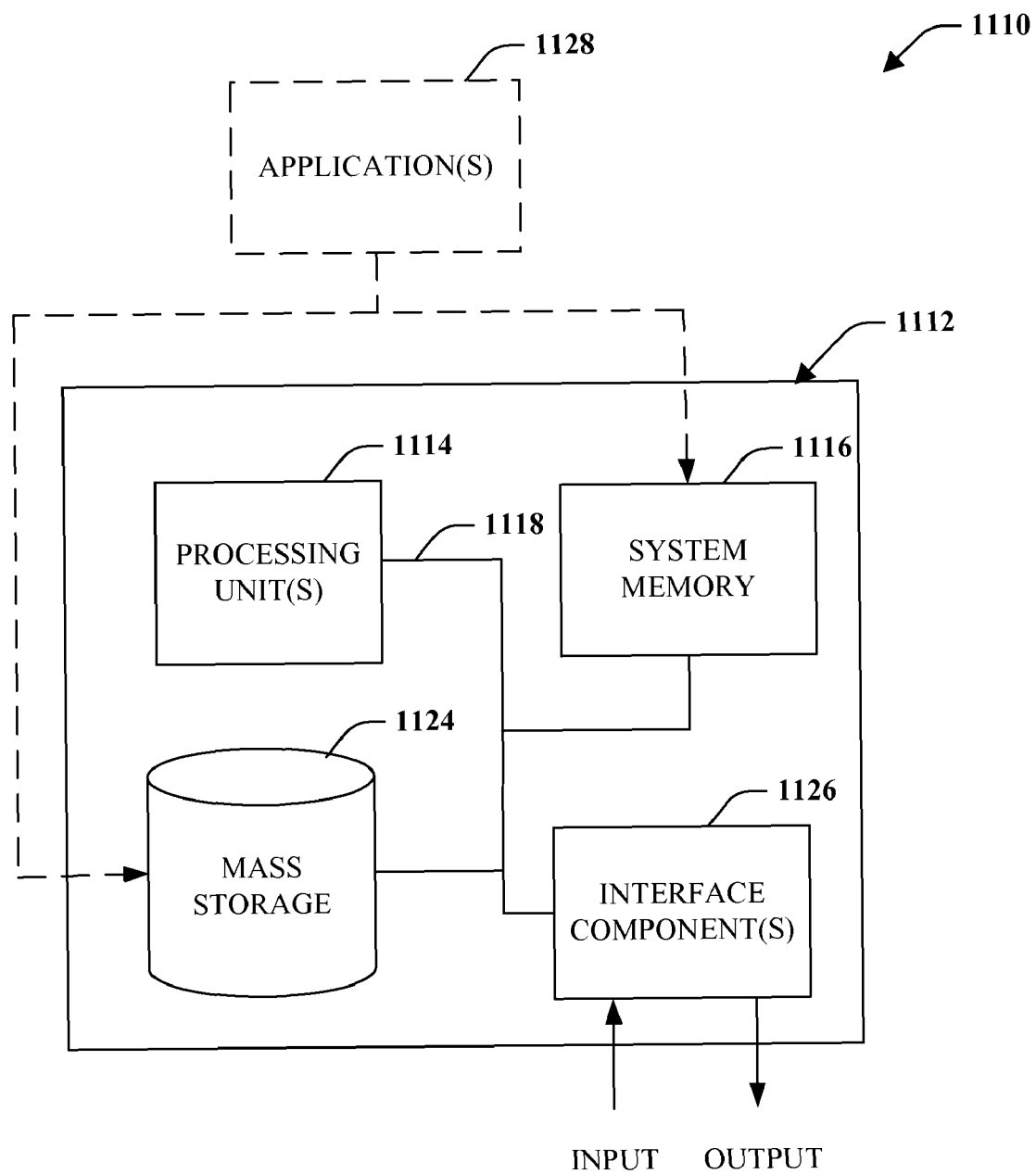
FIG. 11 is a schematic block diagram illustrating a suitable operating environment for aspects of the subject disclosure.
Figure 12:
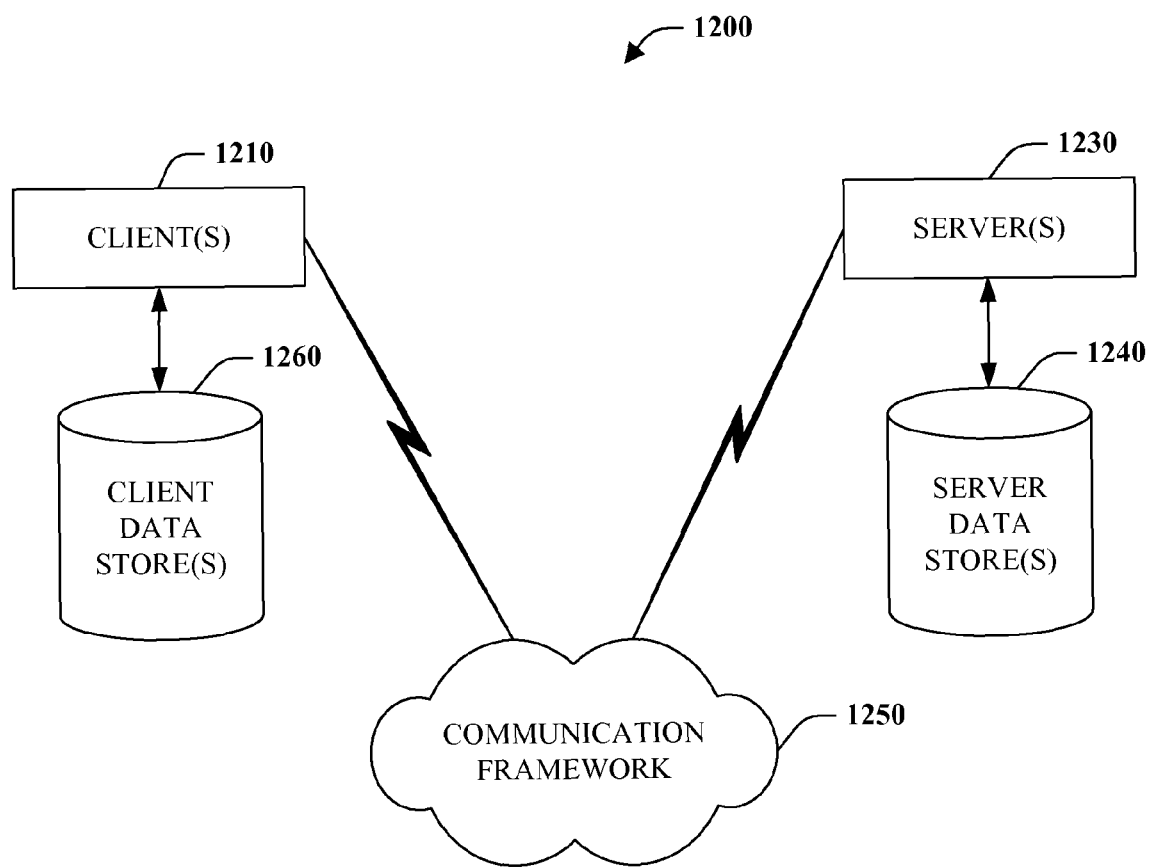
FIG. 12 is a schematic block diagram of a sample-computing environment.

In order to provide a context for the various aspects of the disclosed subject matter, FIGS. 11 and 12 as well as the following discussion are intended to provide a brief, general description of a suitable environment in which the various aspects of the disclosed subject matter may be implemented. While the subject matter has been described above in the general context of computer-executable instructions of a program that runs on one or more computers, those skilled in the art will recognize that the subject innovation also may be implemented in combination with other program modules. Generally, program modules include routines, programs, components, data structures, etc. that perform particular tasks and/or implement particular abstract data types. Moreover, those skilled in the art will appreciate that the systems/methods may be practiced with other computer system configurations, including single-processor, multiprocessor or multi-core processor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the claimed subject matter can be practiced on stand-alone computers. In a distributed computing environment, program modules may be located in both local and remote memory storage devices.

With reference to FIG. 11, an exemplary environment 1110 for implementing various aspects disclosed herein includes a computer 1112 (e.g., desktop, laptop, server, hand held, programmable consumer or industrial electronics . . . ). The computer 1112 includes a processing unit 1114, a system memory 1116 and a system bus 1118. The system bus 1118 couples system components including, but not limited to, the system memory 1116 to the processing unit 1114. The processing unit 1114 can be any of various available microprocessors. It is to be appreciated that dual microprocessors, multi-core and other multiprocessor architectures can be employed as the processing unit 1114.

The system memory 1116 includes volatile and nonvolatile memory. The basic input/output system (BIOS), containing the basic routines to transfer information between elements within the computer 1112, such as during start-up, is stored in nonvolatile memory. By way of illustration, and not limitation, nonvolatile memory can include read only memory (ROM). Volatile memory includes random access memory (RAM), which can act as external cache memory to facilitate processing.

Computer 1112 also includes removable/non-removable, volatile/non-volatile computer storage media. FIG. 11 illustrates, for example, mass storage 1124. Mass storage 1124 includes, but is not limited to, devices like a magnetic or optical disk drive, floppy disk drive, flash memory, or memory stick. In addition, mass storage 1124 can include storage media separately or in combination with other storage media.

FIG. 11 provides software application(s) 1128 that act as an intermediary between users and/or other computers and the basic computer resources described in suitable operating environment 1110. Such software application(s) 1128 include one or both of system and application software. System software can include an operating system, which can be stored on mass storage 1124, that acts to control and allocate resources of the computer system 1112. Application software takes advantage of the management of resources by system software through program modules and data stored on either or both of system memory 1116 and mass storage 1124.

The computer 1112 also includes one or more interface components 1126 that are communicatively coupled to the bus 1118 and facilitate interaction with the computer 1112. By way of example, the interface component 1126 can be a port (e.g., serial, parallel, PCMCIA, USB, FireWire . . . ) or an interface card (e.g., sound, video, network . . . ) or the like. The interface component 1126 can receive input and provide output (wired or wirelessly). For instance, input can be received from devices including but not limited to, a pointing device such as a mouse, trackball, stylus, touch pad, keyboard, microphone, joystick, game pad, satellite dish, scanner, camera, other computer and the like. Output can also be supplied by the computer 1112 to output device(s) via interface component 1126. Output devices can include displays (e.g., CRT, LCD, plasma . . . ), speakers, printers and other computers, among other things.

FIG. 12 is a schematic block diagram of a sample-computing environment 1200 with which the subject innovation can interact. The system 1200 includes one or more client(s) 1210. The client(s) 1210 can be hardware and/or software (e.g., threads, processes, computing devices). The system 1200 also includes one or more server(s) 1230. Thus, system 1200 can correspond to a two-tier client server model or a multi-tier model (e.g., client, middle tier server, data server), amongst other models. The server(s) 1230 can also be hardware and/or software (e.g., threads, processes, computing devices). The servers 1230 can house threads to perform transformations by employing the aspects of the subject innovation, for example. One possible communication between a client 1210 and a server 1230 may be in the form of a data packet transmitted between two or more computer processes.

The system 1200 includes a communication framework 1250 that can be employed to facilitate communications between the client(s) 1210 and the server(s) 1230. The client(s) 1210 are operatively connected to one or more client data store(s) 1260 that can be employed to store information local to the client(s) 1210. Similarly, the server(s) 1230 are operatively connected to one or more server data store(s) 1240 that can be employed to store information local to the servers 1230.

By way of example and not limitation, the aforementioned object-relational mapper 100 can be embodied as a web service managed by the server(s) 1230 and accessed by applications running on client(s) 1210 via the communication framework 1250. Additionally or alternatively, the object relational mapper 100 can acquire object or relationship data from server(s) 1230 and/or associated data store(s) 1240 for mapping and subsequent processing on client(s) 1210 by way of the communication framework 1250.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "contains," "has," "having" or variations in form thereof are used in either the detailed description or the claims, such terms are intended to be inclusive in a manner similar to the term "comprising" as "comprising" is interpreted when employed as a transitional word in a claim.

What is claimed is:

1. An object-relational mapping system for mapping object-oriented constructs to relational database constructs, the system comprising:

one or more computer-executable components embodied on a computer-readable storage medium, the computer-executable components including:

a relationship component configured to identify relationships among a plurality of objects, the plurality of objects including a first object, a second object and a third object, the relationships among the plurality of objects including:

a first relationship between the first object and the second object; and a second relationship between the first object and the third object; and a loading system configured to retrieve, from a relational database, data based on the relationships identified by the relationship component, the loading system including:

a custom locator component configured to:

determine whether a first default SQL query dynamically generated from the first relationship is overridden; and determine whether a second default SQL query dynamically generated from the second relationship is overridden;

a default action component configured to:

in response to the custom locator component determining that the first default SQL query dynamically generated from the first relationship is not overridden, use the first default SQL query to retrieve, from the relational database, data mapped to the first relationship; and in response to the custom locator component determining that the second default SQL query dynamically generated from the second relationship is not overridden, use the second default SQL query to retrieve, from the relational database, data mapped to the second relationship; and an override component configured to:

in response to the custom locator component determining that the first default SQL query dynamically generated from the first relationship is overridden, use a first stored procedure to retrieve, from the relational database, the data mapped to the first relationship; and in response to the custom locator component determining that the second default SQL query dynamically generated from the second relationship is overridden, use a second stored procedure to retrieve, from the relational database, the data mapped to the second relationship.

2. The system of claim 1, wherein the custom locator component identifies method signatures that match default methods to determine whether the first default SQL query is overridden and determine whether the second default SQL query is overridden.

3. The system of claim 1, wherein the first stored procedure, which retrieves the data mapped to the first relationship, includes security and/or logging functionality associated with the first relationship.

4. The system of claim 1, wherein the loading system is configured to retrieve the data based on the relationships via a web service.

5. The system of claim 1, wherein the first stored procedure is generated dynamically as a function of context.

6. An object-relational mapping method performed by a computer including one or more processors and system memory, the method comprising:
   identifying relationships among a plurality of objects, the plurality of objects including a first object, a second object and a third object, the relationships among the plurality of objects including:
      a first relationship between the first object and the second object; and
      a second relationship between the first object and the third object;
   determining that a first default SQL query dynamically generated from the first relationship is not overridden;
   in response to determining that the first default SQL query dynamically generated from the first relationship is not overridden, using the first default SQL query to retrieve, from a relational database, data mapped to the first relationship;
   determining that a second default SQL query dynamically generated from the second relationship is overridden; and
   in response to determining that the second default SQL query dynamically generated from the second relationship is overridden, using a first stored procedure to retrieve, from the relational database, data mapped to the second relationship.

7. The method of claim 6, wherein the first stored procedure, which retrieves the data mapped to the second relationship, includes logging and/or security functionality associated with the second relationship.

8. The method of claim 6, wherein the act of determining that a second default SQL query is overridden includes locating a custom functionality by matching a signature of default behavior.

9. The method of claim 6, further comprising loading the relationship from a web service.

10. The method of claim 6, wherein the overridden second default SQL query is configured to retrieve, from the relational database, the data mapped to the second relationship eagerly; and
   wherein the first stored procedure, which overrides the second default SQL query, is configured to retrieve, from the relational database, the data mapped to the second relationship lazily.

11. A computer readable storage medium having stored thereon computer-executable instructions that perform a method, the method comprising:
   identifying relationships among a plurality of objects, the plurality of objects including a first object, a second object and a third object, the relationships among the plurality of objects including:
      a first relationship between the first object and the second object; and
      a second relationship between the first object and the third object;
   determining that a first default SQL query dynamically generated from the first relationship is not overridden;
   in response to determining that the first default SQL query dynamically generated from the first relationship is not overridden, using the first default SQL query to retrieve, from a relational database, data mapped to the first relationship;
   determining that a second default SQL query dynamically generated from the second relationship is overridden; and
   in response to determining that the second default SQL query dynamically generated from the second relationship is overridden, using a first stored procedure to retrieve, from the relational database, data mapped to the second relationship.

* * * * *